(No Model.) 2 Sheets—Sheet 1.
B. C. VANDUZEN.
COUPLING FOR PUMP RODS.
No. 309,324. Patented Dec. 16, 1884.
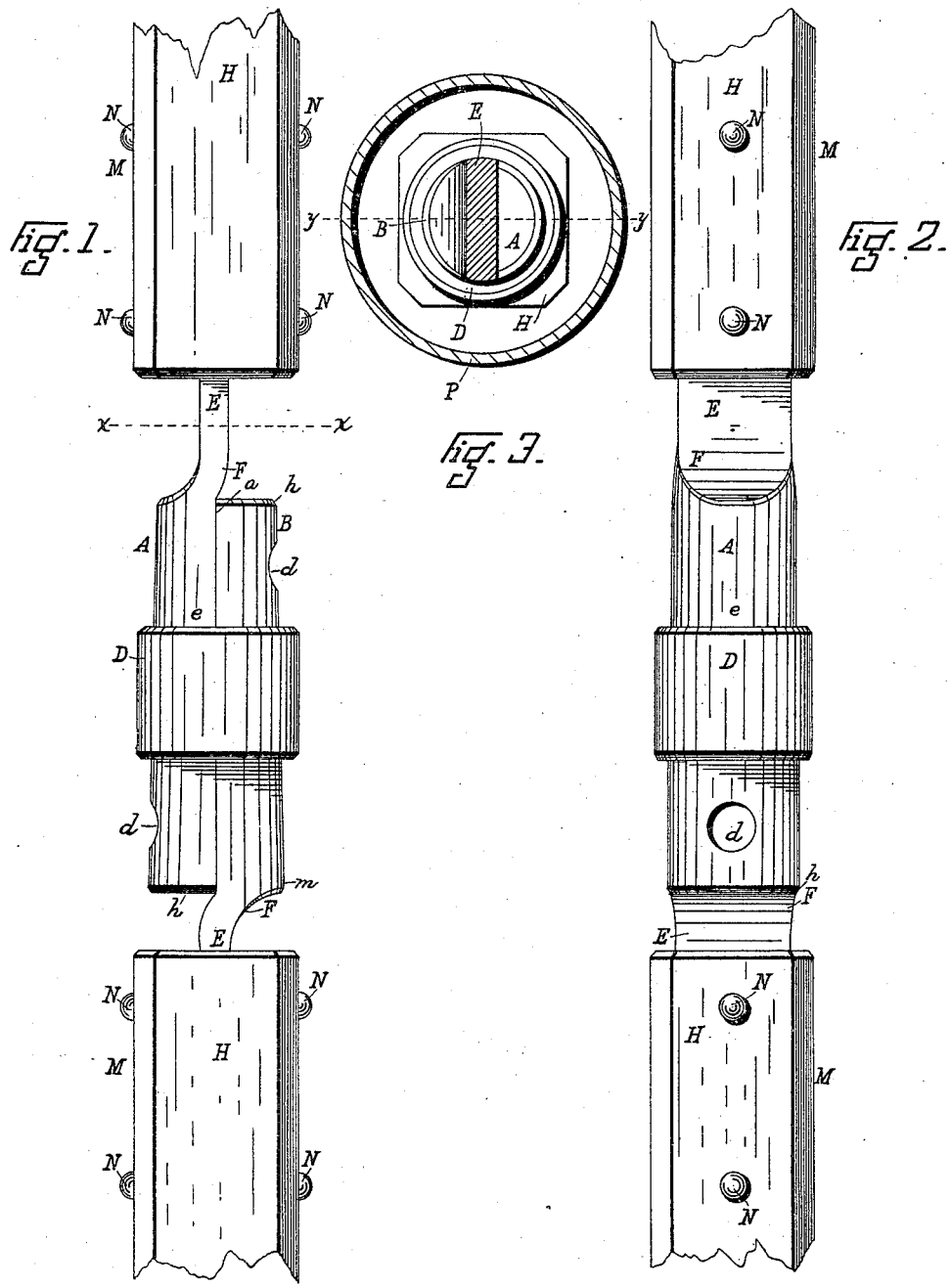
Attest
Alexander Dom
O. M. Hill
Inventor
Benjamin C. Vanduzen
per Wm. Hubbell Fisher,
Atty.

(No Model.) 2 Sheets—Sheet 2.

B. C. VANDUZEN.
COUPLING FOR PUMP RODS.

No. 309,324. Patented Dec. 16, 1884.

Attest
Alexander Dom
O. M. Hill

Inventor
Benjamin C. Vanduzen
per Wm. Hubbell Fisher
Atty

UNITED STATES PATENT OFFICE.

BENJAMIN C. VANDUZEN, OF WINTON PLACE, OHIO.

COUPLING FOR PUMP-RODS.

SPECIFICATION forming part of Letters Patent No. 309,324, dated December 16, 1884.

Application filed April 22, 1884. (No model.)

*To all whom it may concern:*

Be it known that I, BENJAMIN C. VANDUZEN, a resident of Winton Place, in the county of Hamilton and State of Ohio, have invented certain new and useful Improvements in Couplings for Pump-Rods, of which the following is a specification.

The several features of my invention and the various advantages arising from their use, conjointly or otherwise, will be apparent from the following description.

Figure 4:
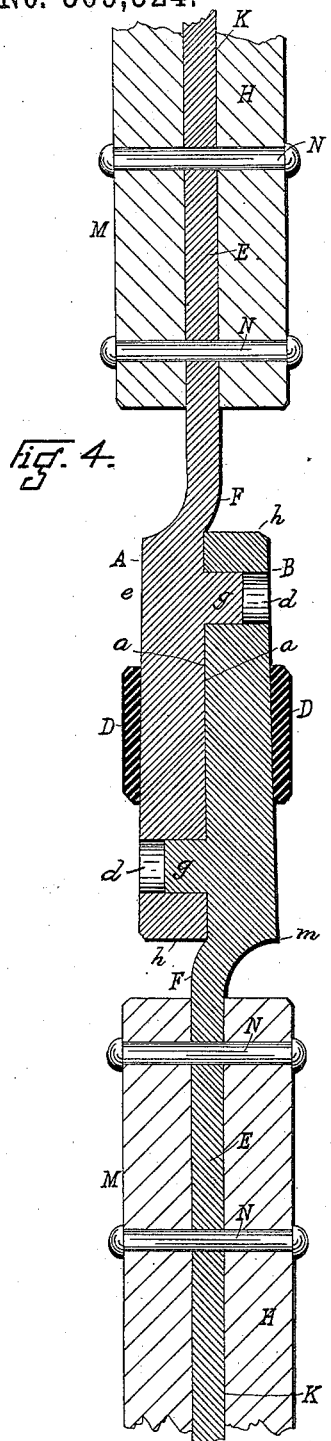
Figure 5:
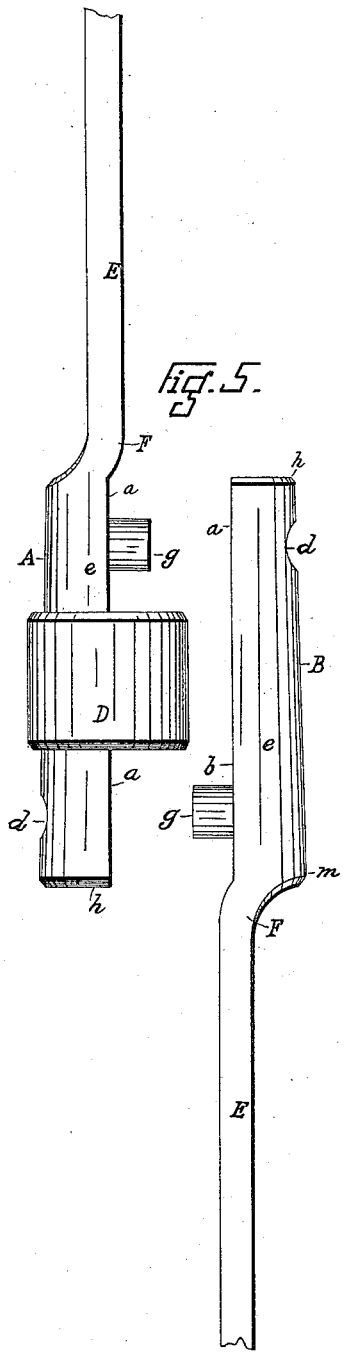

In the accompanying drawings, Figure 1, Sheet 1, represents an elevation of a coupling illustrating my invention, the elevation being of what may, for the purposes of description, be termed the side of the coupling. Fig. 2, Sheet 1, represents a front elevation of the same coupling, looking at that front which is at the left hand in Fig. 1. Fig. 3 represents a transverse section of the coupling device, taken in the plane of the dotted line $x\ x$ of Fig. 1 and looking from above downward. Fig. 4 represents a vertical central section, taken in the plane of the dotted line $y\ y$ of Fig. 3. Fig. 5 is a side elevation of the coupling device, and showing the device uncoupled and the two sections of the device as separated.

A indicates one section or main part of the coupling, and B indicates the other section or main part of the coupling. These sections may not be of exactly the same size. I prefer that they should be of the same size and shape. It is desirable that the side $a$ of section A and the side $a$ of section B are made so that when placed together each of said sides shall fit the configuration of the other and make a close joint. Preferably the sides $a\ a$ are flat. The surface $e$ of each section—that is to say, that surface which forms a portion of the exterior of the coupling when the sections are united—is preferably curved in cross-section, but may consist of several faces or sides. Where the surface $e$ of each section is curved and each section is of the same size, the shape of the two sections, when united together and viewed as a unit, will be circular in cross-section and cylindrical when viewed in elevation. When the surface $e$ consists of faces, the two sections when united will form a body the surfaces of whose sides, instead of being circular in cross-section, will consist of several faces. Each section is provided with a hole or recess, $d$, beginning at its side $a$ and extending a part or all of the way transversely through said section. For convenience of manufacture, this opening $d$ extends through the section. Each section carries a projection, $e$, which is so located that at the same time each section will receive into its opening $d$ the projection $g$ of its opposing section. On the outside of these sections is a ring, D, arranged to closely fit the sections, (when united,) preferably at or in the vicinity of the middle of their length. The sections are made to taper. The one whose free end $h$ is down increases in size toward said free end. The section whose free end $h$ is above increases in size toward its lower end, $m$. The upper (i. e., free) end of the last-named section and the upper or fixed end of the first-named section are of the same size, and the lower or free end of the one section and the lower or basal end of the other section are likewise of the same size. The sections have a corresponding degree of taper, and when united form a tapered cylinder or truncated cone whose upper portion is of lesser breadth or width, or both, and which gradually increases in size toward its bottom. The preferred form of truncated cone—viz., one which in cross-section is of a circular form—is illustrated in the drawings. The interior space of the ring D preferably widens as it descends, so as to everywhere fit the corresponding taper on the coupling. The ring D will of its own weight descend upon the joint to a point where the diameter or breadth or thickness of the joint is equal to the diameter or distance across of the interior space of the ring D. Here the ring will wedge and hold the sections of the joint compactly together. At the same time the lugs or projections $g$ will prevent the sections from sliding laterally or longitudinally upon one another. The joint is readily uncoupled and separated by raising the ring D, slipping it upward above the sections A and B, and then separating the sections. On account of the taper of section A the ring D, if left to itself after the sections are separated, will not slip off the lower end, $h$, of said section, but will lodge at or about the middle of the said section. Thus the ring D cannot be lost, and is always in a convenient position for use. Each of the sections is suitably connected to its adjacent length M of pump-rod. The preferred mode of connecting a section to the rod consists in providing the section with an extension or shank, E, which is of any suitable configuration, but is preferably wide and thin, the broad side being parallel to the inner face of its section A or B. This extension is preferably bent forward toward that section which is opposite to the one which carries it, (said extension)—that is to say, is provided with a bend, F, as shown more particularly in Figs. 1, 4, and 5. This bend enables the vertical center of the extension to coincide with the vertical center of the joint, and enables a vertical push or pull on the pump-rod to act throughout the entire rod in a straight line, and also greatly aids in preventing the rod from buckling. Furthermore, at each joint, as there are two bends—one above and one below—the line of strain is caused to be central at both the upper and lower ends of the joints. Each extension E may be connected to rigid pieces or lengths H of wood or equivalent material, preferably of a symmetrical shape in cross-section. Into each end of such a link or length is placed one of the extensions lengthwise with the length of the link. The preferred mode of providing for such insertion consists in forming a slot, $k$, (by sawing or otherwise,) in the end of such length or link H, and inserting the extension E into said slot. Bolts, screws, or rivets, as N, are passed through the link-piece or length H, and through the extension E through holes made for this purpose, and the extensions E are firmly and rigidly secured to their respective link-pieces H.

The afore-described device is applicable to all wells requiring a long pump-rod, and is very applicable to and is very usefully employed in driven wells, and also in wells consisting of a small tube descending to a great depth. In Fig. 3 the edge of a tubular well is shown.

To the bottom of the first or lower length M of the pump-rod may be attached the plunger or valve or valve-connection, as the case may be. The upper end of this first length is provided with a section, B, which latter is united to a section, A, on the lower end of another length M of the pump-rod. This union is accomplished by lifting the ring D, placing the sections A and B together, face $a$ against face $a$, each projection $g$ of its section entering the recess in the opposing section. The ring D is now slipped down over both sections until its opening is filled by the increasing size of the joint, and then it will be stopped, and then by being pressed down it will be tightly wedged fast, and the joint is made secure. The first length M and second length M are now lowered into the well, and the section on the upper end of the second length M is united to the section on the lower end of the third link, and in this manner length after length is added and united to the pump-rod and lowered into the well until the rod is sufficiently long. The upper end is then connected to the pump-lever or equivalent device, and the rod is in condition to be used.

The mode of taking the lengths apart is precisely the reverse of the mode employed in putting them together. For example, the ring of the uppermost coupling is slipped up above the upper end of section A, and section B is then separated from section A, and the ring D allowed to slip down on section A, as shown in Fig. 5. The pump-rod is now lifted till the coupling next below is reached, and this coupling is separated in like manner. Thus coupling after coupling is uncoupled until all of the couplings, or as many as desired, are separated, and their respective lengths M of pump-rod are removed from the said rod.

While I prefer to employ two projections $g$ in each coupling, one of such projections and its corresponding recess may be omitted. The projection may be of any desired shape and size, and located anywhere on the side $a$ of the section, the recess in the opposing section to receive said projection being properly shaped to receive and engage said projection.

The various features of my invention are preferably employed together; but one or more of said features may be employed without the remainder, and in so far as applicable one or more of said features may be employed in connection with pump-rods and connections other than those herein specifically described.

What I claim as new and of my invention, and desire to secure by Letters Patent, is—

1. The sections A and B, tapered as described, and adapted to fit together, and the inclosing adjustable ring, and means, substantially as described, for preventing the sections from sliding upon each other, substantially as and for the purposes specified.

2. The combination of sections A and B, each section being of the shape of a semicircle in cross-section and tapered, and the surrounding adjustable ring D, and means, substantially as described, for preventing the sections from sliding laterally upon one another, substantially as and for the purposes specified.

3. The combination of sections A and B of the coupling, the coupling increasing in size from above downward, and the surrounding adjustable ring D, and means, substantially as described, for preventing the sections from sliding upon each other, substantially as and for the purposes specified.

4. In a pump-coupling, the combination of sections A and B and projection on one section engaging a recess in the other section, and ring D, substantially as and for the purposes specified.

5. In a pump-rod coupling, the combination of sections A and B, each provided with recess $d$ and projections $g$ $g$, one of which latter is connected to each section and engages its opposite recess, $d$, substantially as and for the purposes specified.

6. In a pump-rod coupling, the combination of sections A and B, each provided with recess $d$ and projections $g\ g$, one of which latter is connected to each section and engages its opposite recess, $d$, each section increasing in size from above downward, substantially as and for the purposes specified.

7. The combination of sections A and B, each provided with a shank or extension, E, and ring D, and means, substantially as described, for preventing the sections from sliding upon each other, substantially as and for the purposes specified.

8. The combination of sections A and B and shank or extensions E E, each section being united to a shank, and the shank having the bend F, substantially as and for the purposes specified.

9. The combination of the link-pieces H, provided with slots in their ends, and the shanks E, each provided with bend F, and sections A and B, one of such shanks E being united to each section and the sections being tapered, substantially as described, and the inclosing-ring D, and means, substantially as described, for preventing the sections from sliding one on the other, substantially as and for the purposes specified.

10. The combination of the link-pieces H, provided with slots in their ends, and the shanks E, each provided with bend F, and sections A and B, one of such shanks E being united to each section, and their sections being tapered, substantially as described, and the inclosing-ring D and projection or projections $g$ engaging a corresponding recess in the opposing section, substantially as and for the purposes specified.

11. The combination of tapered sections A and B and ring D interiorly tapered, and means, substantially as described, for preventing the sections from sliding on each other, substantially as and for the purposes specified.

BENJAMIN C. VANDUZEN.

Attest:
JNO. W. STREHLI,
O. M. HILL.